Patented Feb. 21, 1928.

1,660,090

UNITED STATES PATENT OFFICE.

WILLIAM HENRY PERKIN, OF OXFORD, AND HUGH MILLS BUNBURY, OF MANCHESTER, ENGLAND, ASSIGNORS TO BRITISH DYESTUFFS CORPORATION LIMITED, OF MANCHESTER, ENGLAND.

PROCESS FOR THE MANUFACTURE OF MONO-BENZOYL-DIAMINO-ANTHRAQUINONE COMPOUNDS.

No Drawing. Application filed March 4, 1926, Serial No. 92,332, and in Great Britain July 8, 1925.

This invention relates to the manufacture of mono-benzoyl derivatives of diamino-anthraquinones including substituted mono-benzoyl derivatives. Monobenzoylated diamino-anthraquinones have long been valuable intermediates in the manufacture of dyestuffs of the anthraquinone series but no simple way of preparing them has been known. If a diamino-anthraquinone be treated with benzoyl chloride both amino groups are attacked so that if benzoylation occurs at all the dibenzoyl derivative is the main product. In some cases the following route has been successfully used for getting the desired products. The mono-amino-anthraquinone is acetylated and then nitrated and saponified and the nitro-amino-anthraquinone is then benzoylated and converted into the mono-benzoyl-diamino-anthraquinone by reduction.

An attempt has been made to obtain the desired mono-benzoylated derivatives from diamino-anthraquinones by first treating the diamino-anthraquinone with oxalic acid to obtain the mono-oxamino derivative. These can then be benzoylated to benzoyl-oxalyl-diamino-anthraquinones and it was hoped that the oxamino group could be removed without interfering with the benzoyl group, but in practice this process often fails owing to the conversion of the oxalyl group into a formyl group which resists removal except by processes which also eliminate the benzoyl group.

We have now found that mono-benzoyl- and substituted monobenzoyl-diamino-anthraquinones can be obtained very simply and in good yield by treating the diamino-anthraquinones with benzoic anhydride or a substituted benzoic anhydride. The reaction is preferably effected in the presence of a solvent and nitro-benzene appears to be the most convenient to use. The benzoic anhydride is used in slight excess over the quantity required for producing the monobenzoyl derivative.

The following examples will serve further to illustrate the nature of the invention, but the invention is not confined to the examples. The parts are by weight.

*Example I.—Production of 1-amino-5-benzoylaminoanthraquinone.*

100 parts of 1:5-diamino-anthraquinone are well stirred in 1000 parts of nitrobenzene at 175°–180° C. for half an hour. 110 parts benzoic anhydride (15.8% over theory for one benzoyl group) dissolved in 100 parts of nitrobenzene by warming on the water-bath are then added to the solution of diaminoanthraquinone and the whole well stirred at 175° C. for 15 to 20 minutes. The reaction mixture is cooled to 120° C. and filtered. The residue is the dibenzoyl compound. The filtrate is allowed to stand for 1½ to 2 hours, or until its temperature reaches 25°–30° C. when the monobenzoyl derivative crystallizes out and is filtered off, washed with spirit and dried. When working as above described about 98 parts of the desired monobenzoyl-aminoanthraquinone are obtained and about 31 parts of the dibenzoyl derivative. If desired the dibenzoyl derivative can be hydrolyzed and the diamino-anthraquinone recovered and used in a subsequent operation. A further recovery of the diaminoanthraquinone can be effected by distilling off the nitrobenzene, finishing the distillation in steam and hydrolyzing the residue.

The amount of anhydride used can be varied but if a smaller quantity be used the yield is less and the quality of the product inferior. If the amount of benzoic anhydride be increased say to 30% excess less monobenzoyl compound is obtained and more dibenzoyl. Similarly also variations can be made in the amount or quantity of the solvent but higher concentrations appear to favour the formation of dibenzoyl derivative and with lower concentrations than those described in the example, although the weight of monobenzoyl body obtained appeared to be increased, the purity of the product suffers.

If desired the benzoylation can be carried out with benzoic anhydride made in the presence of the diamino-anthraquinone, for instance, from benzoyl chloride and benzoic acid or sodium benzoate instead of taking separately prepared benzoic anhydride, but we have obtained the most satisfactory results by using isolated benzoic anhydride as described in the foregoing example.

The 1-amino-8-benzoyl-aminoanthraquinone can be prepared in the same way but in this case the yield of the dibenzoyl compound is smaller. Also the 1-amino-4-benzoyl-amino-anthraquinone can be prepared similarly but in this case no dibenzoyl derivative appears to be formed even when a 30% excess of benzoic anhydride is used.

*Example II.—Preparation of 1-amino-5-anisoyl-aminoanthraquinone.*

By treating 1:5-diaminoanthraquinone with anisic anhydride in the manner described above, the monoanisoyl-1-5-diaminoanthraquinone is obtained. 130 parts of anisic anhydride are required for 100 parts of the diamine. The reaction mixture is filtered at 110–120° C., the residue being the dianisoyl derivative. The filtered liquors on standing deposit the monoanisoyl compound which is filtered off at 40–50° C. About 88 parts are obtained which after one recrystallization from nitrobenzene shew a melting point of 232–233° C.

This process not merely affords a simple way of preparing the monobenzoyl-amino-anthraquinones but it is also valuable as affording a simple means of protecting one amino group of a diamino-anthraquinone. This can already be done by the aid of oxalic acid forming the amino-oxamino compounds but the mono-benzoyl compounds offer distinct advantages in many cases.

We claim:—

1. The process of preparing monobenzoyl-diamino-anthraquinones which comprises treating diamino-anthraquinones with a benzoic anhydride in the presence of a solvent.

2. The process of preparing monobenzoyl-diamino-anthraquinones which comprises treating diamino-anthraquinones with a benzoic anhydride in the presence of a solvent comprising nitrobenzene.

3. The process of preparing substituted monobenzoyl-diamino-anthraquinones which comprises treating diamino-anthraquinones with a substituted benzoic anhydride in the presence of a solvent comprising nitrobenzene.

4. The process of preparing monobenzoyl-diamino-anthraquinones which comprises treating a diamino-anthraquinone with a benzoic anhydride, the anhydride being in slight excess over the theoretical amount necessary to form a monobenzoyl-diamino-anthraquinone, and the process being carried out in the presence of nitrobenzene as a solvent.

In testimony whereof we have hereunto affixed our signatures.

WILLIAM HENRY PERKIN.
HUGH MILLS BUNBURY.